Figure 3:
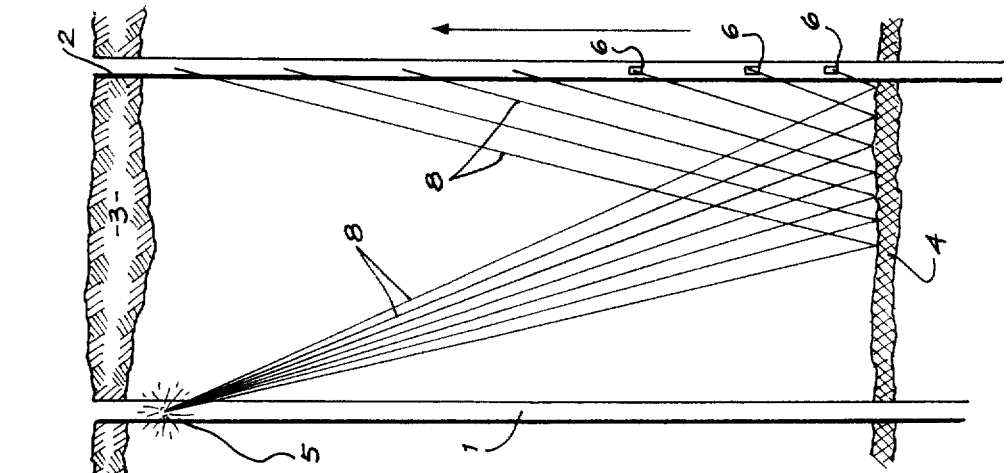

United States Patent [19]

Hawkins

[11] 4,298,967
[45] Nov. 3, 1981

[54] HIGH RESOLUTION DOWNHOLE-CROSSHOLE SEISMIC REFLECTION PROFILING TO RESOLVE DETAILED COAL SEAM STRUCTURE

[75] Inventor: Laric V. Hawkins, Cammeray, Australia

[73] Assignee: Unisearch Limited, Kensington, Australia

[21] Appl. No.: 48,541

[22] Filed: Jun. 13, 1979

[51] Int. Cl.³ .......................... G01V 1/20; G01V 1/40
[52] U.S. Cl. ........................................ 367/57; 367/75; 367/25; 181/106; 181/113
[58] Field of Search .............................. 367/25, 57, 58

[56] References Cited

U.S. PATENT DOCUMENTS

| | | | |
|---|---|---|---|
| 3,208,549 | 9/1965 | Alexander et al. | 367/25 |
| 4,214,226 | 7/1980 | Narasimhan et al. | 367/57 |

FOREIGN PATENT DOCUMENTS

| | | | |
|---|---|---|---|
| 1569582 | 6/1980 | United Kingdom | 367/57 |

OTHER PUBLICATIONS

Fowler, *Cross Hole Acoustic Sensing System;* pp. 1-28, Conf. on Site Exp. in Rock . . . , Ensco, Inc.
Karus et al., "Detailed Investigations of Geological Structures by Swell Surveys", 1975, pp. 247-257, 9th World Petroleum Congress, vol. 3.
McCann et al., "Inter Borehole Acoustic . . . ", 6/73, pp. 50-55, 35th Meeting of BAEG, Brighton, Eng.
Bois et al., "*Well-to-Well Seismic Measurements*", 6/72, pp. 471-480, Geophysics, vol. 37, #3, G-222.

*Primary Examiner*—Nelson Moskowitz
*Attorney, Agent, or Firm*—Michael J. Striker

[57] ABSTRACT

A method of seismic surveying which provides a horizontal profile of reflector surfaces located between two spaced apart drillholes which profile appears similar to that of a marine type seismic reflection profile. The method comprising raising and lowering a seismic source and receiver in adjacent drillholes to provide a profile of reflectors which are located between the drillholes.

6 Claims, 3 Drawing Figures

HIGH RESOLUTION DOWNHOLE-CROSSHOLE SEISMIC REFLECTION PROFILING TO RESOLVE DETAILED COAL SEAM STRUCTURE

The present invention relates to a geophysical exploration/development technique for exploration of geological structures such as coal seams.

Attempts to apply high frequency seismic reflection techniques to obtain high resolution from surface surveys have encountered considerable problems because of the surface weathering and elevation effects, causing attenuation of the high frequency waves required for high resolution, and the uncertainties introduced by the large near surface variations which seriously distort the results.

One approach to the solution of the problems introduced by the variability of the near surface "static corrections" required in processing the seismic data, and the attenuation problems involved in the use of high frequencies, would be to place both the seismic sources and the receiving seismometers in shallow holes drilled to beneath the weathered layer. However such an approach does not provide a sufficiently accurate profile to enable the necessary economic decisions to be made prior to undertaking mining development of the relevant ore or mineral deposit.

It is an object of the present invention to provide a method for accurately detailing the delineation of reflectors in an ore or mineral body such as a coal seam.

In accordance with the present invention there is provided a method of seismic exploration and/or detecting seismic reflectors between at least two adjacent drillholes extending below a surface weathered layer whereby a seismic source is located in one drillhole and a seismic receiver is located in at least the other drillhole, said method comprising applying relative vertical movement between said source and said receiver during generation of seismic waves by said source, and recording said source and receiver signals in conjunction with the configuration of said relative movement between said source and receiver.

The present invention is particularly suited as a mining development technique, rather than an initial exploration procedure in virgin areas. It may be employed to provide detailed, more precise information on particular seam or reflector perturbation between existing grid drilling control as may exist in, say, an area of coal interest which has been drilled on a 300-250 meter or similar grid pattern.

To effect the method of the invention a downhole repetitive seismic source system, such as a sparker, small air-gun, implosion or other source may be employed in conjunction with a downhole seismic receiver system employing a high quality hydrophone. However, it is envisaged that in alternative arrangements a horizontally polarized shear wave (SH) source and SH component seismometer system could be used. Further advantages are likely to be gained by utilizing SH waves as well as the more usual dilational (P) waves, because of the lack of wave conversion at interfaces as exists between dilational waves and vertically polarized shear (SV) waves.

Figure 2:
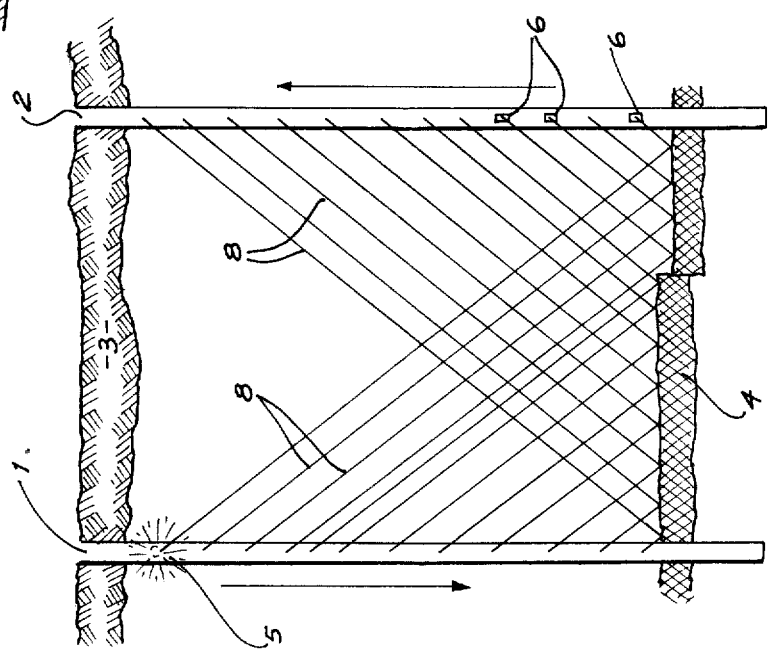
Figure 1:
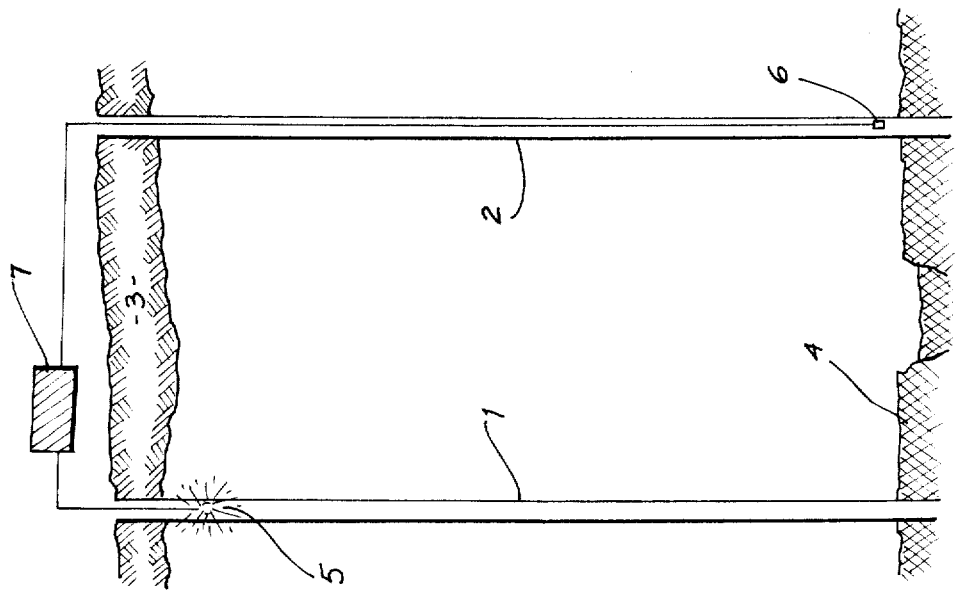

The present invention will now be described by way of example with reference to the accompanying drawings, in which:

FIG. 1 is a schematic arrangement of components in situ to be employed in the method of the invention, FIG. 2 is a schematic arrangement showing the manner of operation of a first embodiment of the invention, and FIG. 3 is a schematic arrangement showing the manner of operation of a second embodiment of the invention.

Referring to FIG. 1 there is shown a pair of adjacent drill holes 1, 2 extending below the surface weathered layer 3 and preferably to depth so as to intersect the reflector of interest, say, a coal seam, 4. A repetitive seismic source 5 is located in hole 1 and a seismic receiver 6 is located in hole 2, the source 5 and receiver 6 being connected to a source and recording instrument system 7.

In the proposed system, at least one of the source 5 and receiver 6 is capable of being lowered and raised in adjacent drillholes of a drilling pattern.

A repetitive seismic source 5 is appropriate in order to permit repetition of signals to allow simple stacking to improve the seismic signal/noise.

In the embodiment of FIG. 2, the source 5 is lowered down the drillhole 1 as the receiving hydrophone or seismometer 6 is simultaneously raised in adjacent drillhole 2, or vice verse. By the method of this embodiment, (hereinafter referred to as a "diablo" system), an essentially constant reflection path length between source and receiver is maintained where the rates of lowering and raising are maintained substantially constant, respectively, but because of the very nature of the source-receiver geometry, the reflection point on the coal seam or seams 4 and other reflectors, is gradually migrated along the whole length of the reflectors between the drillholes 1, 2 as the source and receiver are raised and lowered simultaneously, as shown in FIG. 2. The ray paths 8 in this figure are shown as straight lines for simplicity, but slight bending or curvature will actually occur due to changes in velocity with depth and some velocity variations with the geological section.

As shown in FIG. 3 either the source 5 or receiver 6 may be kept at a constant position, say just below the weathered layer, such as may be convenient if using an SH shear wave system. The alternative element (source 5 or receiver 6) would then be lowered and/or raised in the adjacent hole. This would result in covering only half of the reflector from each fixed position but the remaining half of the reflector can be similarly covered by simply reversing the fixed source 5 or receiver 6.

In the case of the "diablo" system (FIG. 2) where the ray path 8 is constant, the output from each source-receiver position (after stacking, anti-aliasing filtering an on-line, real-time deconvolution to enhance signal/noise and resolution, and gain-ranging floating point amplification for subsequent true amplitude recovery on play-back where required) can be played out directly on a normal "marine profiler" type of instrument such as an "EPC" recorder or other commercial play back recorder.

Marine type recorders move a small set increment along the record for each trace (i.e. for each source-receiver position) as the reflection point on the coal seam or other reflector migrates between the drillholes. Whatever detail between the reflection points is desired can be obtained by the choice of the spacing between successive source-receiver positions. This provides a direct, instantaneous record-section of the reflecting layers between the drillholes, just as if one had been able to run a "marine type" seismic reflection profile between the drillholes. Where a fixed source with mobile receiver (or vice verse) is used, a connection for path length variation must be made in the data processing.

Where enclosed repetitive sparker seismic sources have been used down drillholes as proposed in a paper read at the 35th meeting of the EAEG, Brighton, England, June 1973 by McCann, Grainger and McCann, they have been used in direct hole to hole surveys with source and receiver at the same elevation and not for continuous reflection profiling of geological beds between the holes as presently proposed. McCann's downhole sparker source is contained in an enclosed metal tube and radiates most of the seismic energy by its spark discharge in an enclosed saline solution, horizontally outwards from the source.

In order to obtain more downward propagation of seismic energy required for the presently proposed crosshole reflector profiling, the strong metal tube casing of the enclosed sparker source being tested is terminated with a diaphram at its base (lower end of tube). The diaphram while being strong enough to keep the sparker enclosed, is weaker than the metal tube, thus allowing more seismic energy to be propagated downwards for reflection from the reflector or the bed. The diaphram may be made of thinner metal or other material such as rubberized fabric.

As illustrated in FIG. 2, the coal seam or other reflector 4 may be reflection profiled between two drillholes by raising either the source or receiver in one hole while simultaneously lowering the other between points just above the reflector and some level below the near surface weathered zone. This obviates problems associated with the attenuation and distortions introduced by the near surface conditions. Since this upper level may be any height above the reflector, the distance over which the source and detector are raised and lowered may be varied, which will vary the angles of incidence and reflection at the reflector. This allows some control of the angles of incidence and reflection so that an optimum arrangement may be used.

Further, by this reflection profiling by raising and lowering the source and receiver between different levels to obtain a number of reflection profiles, one for each vertical distance of source and receiver traverse, these may be digitally recorded, say on magnetic tape, and combined together so as to combine the data from the common reflection points of each of the profiles. This will allow an improvement in signal/noise of the data, and an improved resolution of the reflector geometry.

What I claim is:

1. A method of seismic exploration and/or detecting seismic reflectors, including the steps of providing at least two adjacent drillholes extending below a surface weathered layer so that a seismic reflector extends between the drillholes; arranging a seismic source in one of the drillholes and a seismic receiver in at least the other drillhole and actuating the same so that seismic signals generated by the seismic source are reflected from the seismic reflector extending between the drillholes and then received by the seismic receiver; moving said seismic source and said seismic receiver relative to one another substantially vertically in mutually opposite directions, so that when one of said seismic source and seismic receiver is lowered, the other of said seismic source and seismic receiver is raised; and recording said seismic source and seismic receiver signals in conjunction with the relative movement between said seismic source and said seismic receiver.

2. A method as claimed in claim 1, wherein said moving step includes maintaining the rates of the lowering and raising of said seismic source and said seismic receiver, respectively, substantially constant, to thereby maintain the reflection path length between said seismic source and said seismic receiver substantially constant.

3. A method as claimed in claim 1 wherein said source comprises a sparker, an air-gun, or explosion or implosion system.

4. A method as claimed in claim 1 wherein said source produces a horizontally polarised shear wave and said receiver comprises an SH component seismometer.

5. A method as claimed in claim 3 wherein said receiver comprises a hydrophone.

6. A method as claimed in claim 3, wherein said sparker is arranged in a strong casing and provided with a diaphragm at its lower end.

* * * * *